July 22, 1958      J. H. DE FREES      2,844,121

LIQUID VOLUME-LEVEL INDICATOR

Filed Aug. 8, 1956      2 Sheets-Sheet 1

INVENTOR.
Joseph H. DeFrees
BY
Hyde, Meyer, Baldwin & Doran
Attorneys

July 22, 1958    J. H. DE FREES    2,844,121
LIQUID VOLUME-LEVEL INDICATOR

Filed Aug. 8, 1956    2 Sheets-Sheet 2

INVENTOR.
Joseph H. DeFrees
BY
Hyde, Meyer, Baldwin & Doran
Attorneys

United States Patent Office 2,844,121
Patented July 22, 1958

2,844,121

LIQUID VOLUME-LEVEL INDICATOR

Joseph H. De Frees, Warren, Pa.

Application August 8, 1956, Serial No. 602,864

2 Claims. (Cl. 116—118)

This invention relates to novel and improved means for accurately indicating the level of liquid in containers of substantial size. As several examples of such containers, we may mention stationary storage tanks for holding hydrocarbons fluids such as gasoline, the heavier hydrocarbons such as lubricating oils, and transportation tanks for these and other liquids such as chemicals, etc.

An object of the present invention is to provide volume indicating means which can be adjusted to an accuracy heretofore unattained in the measuring devices heretofore used in commercial storage or transportation tanks.

Another object is to provide indicating means as defined in the last preceding paragraph which is of simple and inexpensive construction.

A further object of the invention is to provide a volume indicating means for adaptation to the manhole or filling aperture of a tank, and which will induce reduction of liquid surge with consequently greater measuring accuracy.

A further object of the invention is to provide a volume indicating means of the character defined in the three preceding paragraphs, which, when used in multiple in a tank manhole, permits independent adjustment or change of position of any one or more of the units without interference with the predetermined position of the remaining units.

A further object of the invention is the provision of a volume indicator of the character hereinbefore defined, whereof a plurality may be used in the annular skirt of a fill aperture or manhole, the units being usually in helically staggered relationship instead of one above the other as was the custom heretofore.

Other objects and advantages of the invention will become apparent upon a study of the following description in conjunction with the accompanying drawings in which.

Figure 1:
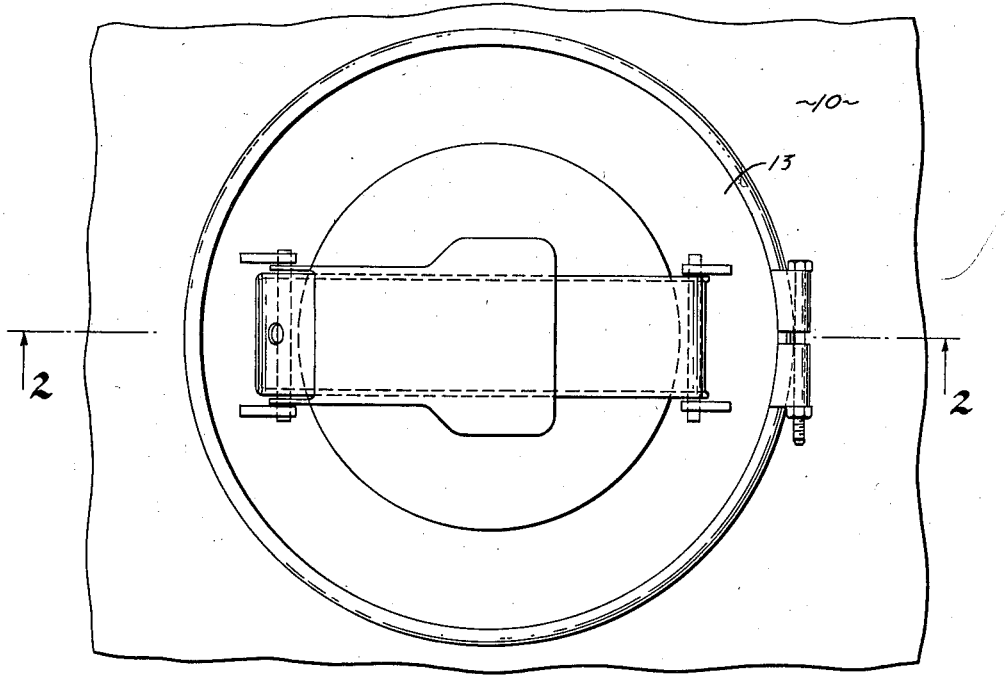
Fig. 1 is a top plan view of a manhole cover closure with a fragmentary showing of the associated top wall of a liquid container.

Before proceeding to a description of the invention, I may note that the terms "volume indicator" and "level indicator," herein sometimes used interchangeably, are both actually used correctly since, with any specific tank or container, the surface level of the liquid determines the volume of the liquid in the container, and vice-versa. It follows from this that if a known volume of liquid be poured into the container, and a marker be placed to accurately show the surface level, said marker may be used from that time forth to inform an operator, who is filling the container from a liquid source, as to when the desired liquid volume is in the container. It is likewise obvious that a plurality of markers can be disposed in a manhole skirt, which depends into the liquid space, said plurality of markers being calibrated as to their position to show a respective plurality of levels, and this greatly facilitates the work of discharging any required amount of liquid into the container.

I have provided means for accomplishing this end in such way that the above-recited objects of the invention are attained.

Proceeding now to a description of my invention, there is shown a fragmentary portion 10 of the upper wall of a storage or transportation tank, said wall being formed from sheet metal. The wall is provided with a manhole defined by an annular neck 11, also of sheet metal, which is welded or otherwise attached to the top wall 10 in leak-proof relationship. The neck 11 is provided with an outturned flange 12 lying in a horizontal plane and serving as a seat for a cover plate 13 and associated closure, vent, and sealing elements not necessary to describe more in detail herein, but more fully described in my co-pending application, Serial No. 366,848, filed July 8, 1953, for Manhole Cover Attaching Means.

Depending from neck 11 is a cylindrical skirt 14 which extends downwardly below the normal liquid level in the tank. Merely for illustration I have shown a broken line A—A (Fig. 2) representing the liquid surface for one volumetric content. Since the skirt 14 is open at the bottom, and in any event is perforated as described hereinbelow, the level within and outside skirt 14 is coplanar.

Skirt 14 is provided with a great number of identical apertures 15, arranged in a continuous ascending (or descending) helix in the manner of a screw thread progression. In one commercial embodiment the skirt was sixteen inches in vertical height and the holes were on one-half inch triangular centers, the "pitch" of the helix being .0433" per 360°, the rise between one hole and its immediate lateral neighbor being approximately .004 inch. It may be inferred, therefore, that if a marking device be attached by means of a bolt or screw through one of the holes 15, the device may later be moved to an adjacent hole to produce a change in vertical height of .004 inch, and it may be further inferred that a rise or fall of liquid level by that amount represents a volumetric change of a small fraction of a gallon. If, therefore, a metered amount of liquid be poured into the tank for calibration purposes, and an indexing marker be placed so that its indexing line or point is exactly at liquid level, the volumetric situation can be exactly duplicated at any future time. A high degree of accuracy can be attained by moving the marker helically until the indexing point or line thereon is exactly in registration with the liquid level. A plurality of markers may be provided for a respective plurality of volumetric contents.

Figure 3:
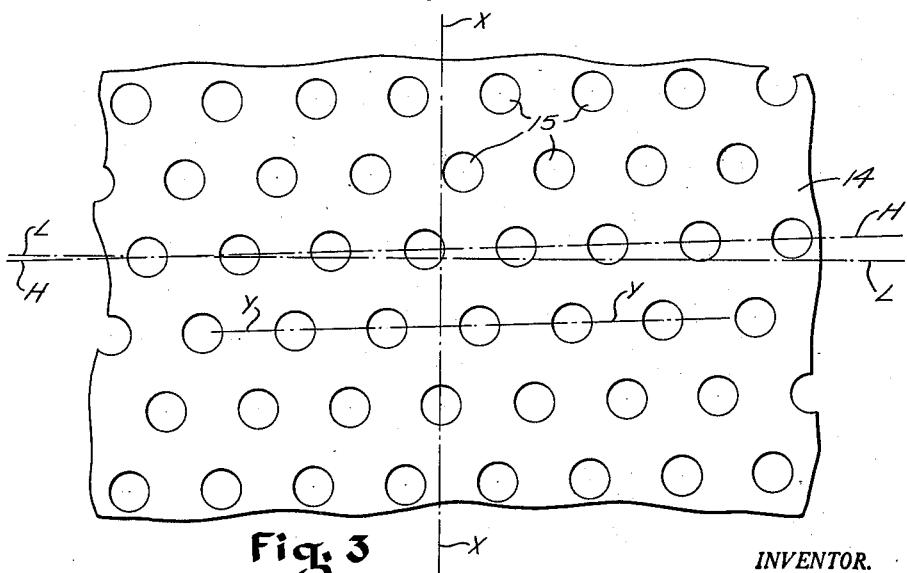
Fig. 3 is a view, somewhat enlarged, showing a limited portion of the skirt wall shown in Fig. 2.

In Fig. 3 I have shown a fragmentary portion of the skirt, somewhat enlarged, and in planar projection. The line L—L may be regarded as representing a horizontal plane intersecting the vertical cylindrical axis X—X of the neck at right angles. The line L—L may therefore be regarded as one example of a liquid level for a certain liquid content. The line H—H represents the helical progression of the aperture centers. Even though dimensions are exaggerated for a better visualization of the effect, the drawing (Fig. 3) may serve to illustrate the minute divergence in vertical height between adjacent apertures. The next lower line Y—Y of helical progression is added to provide an indication of the "pitch" of the helix represented by the aperture centers.

Figure 2:
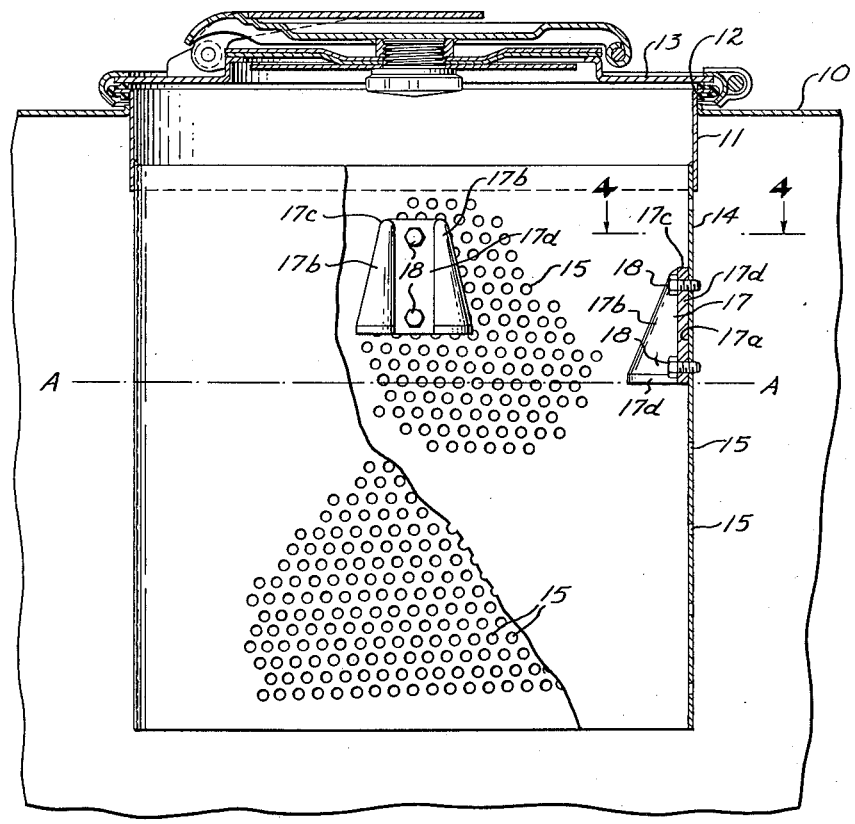
Fig. 2 is a vertical sectional view taken on the line 2—2 of Fig. 1.
Figure 4:
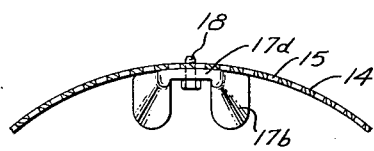
Fig. 4 is a top plan view of a level marker.

Any suitable member attachable in an aperture may serve as a marker although, for greater accuracy, it is desirable that the marker have at least two attaching members inserted in respective apertures. Two such markers 17 are shown in Fig. 2, and they are in this instance identical. Each marker is of wall-bracket type, having a cylindrical surface 17a curved to conform to the inner periphery of skirt 14. Two angular wings 17b extend downwardly and away from the apex 17c leaving a web 17d of reduced thickness down the middle. Web 17d provides metal stock for two bored apertures through which self-threading screws 18 may pass outwardly, and tightly engage respective vertically-spaced apertures. The spacing of the screws 18 accurately fixes the position of the marker for any selected level, and prevents off-level cocking of the marker such as might occur if there were only one screw. It may be observed that in Fig. 2 the screws 18 are disposed in apertures five rows apart, which apertures are in vertical registry. For any selected position of a marker, two apertures will be found in such vertical registry. These numerical and dimensional relationships are merely for convenience of explanation and illustration, and may, of course, be varied, as may the construction and design of the marker for convenience or expediency. I have found the wide bases and other structural features of the markers are helpful in surge suppression as the desired level is approached.

The objects of the invention may be checked against the construction just described, and it will be found that the described structure is simple, and easy to construct, install and operate. It will also be obvious that a plurality of such markers may be individually added, adjusted, or removed without mutual interference, and that a staggered arrangement is actually desirable rather than, as heretofore, a vertical row of markers which actually render observation difficult.

Any suitable point or line on the marker may be selected as the calibration indexing point. The markers may be identified by respective numbers, or otherwise, which identification system will have significance to the operator with respect to the liquid volume represented thereby.

What I claim is:

1. Liquid level indicating means of the character described for a liquid container having an aperture in the top wall thereof, said indicating means comprising a tubular skirt depending from said top wall and disposed to be partially immersed in the liquid, said skirt being provided with a plurality of apertures disposed in a vertically progressing helical path, a marking device adapted for removable securement in any one of said apertures whereby small increments of vertical height may be marked by movement of said marking device from one to another aperture along said helical path.

2. Liquid level indicating means as defined in claim 1 wherein said skirt is provided with a plurality of marking devices removably attached in a respective plurality of apertures.

References Cited in the file of this patent
UNITED STATES PATENTS

| | | |
|---|---|---|
| 615,238 | Barron | Dec. 6, 1898 |
| 1,722,101 | Little | July 23, 1929 |
| 1,768,946 | Anschicks | July 1, 1930 |
| 1,788,265 | Wood | Jan. 6, 1931 |